UNITED STATES PATENT OFFICE.

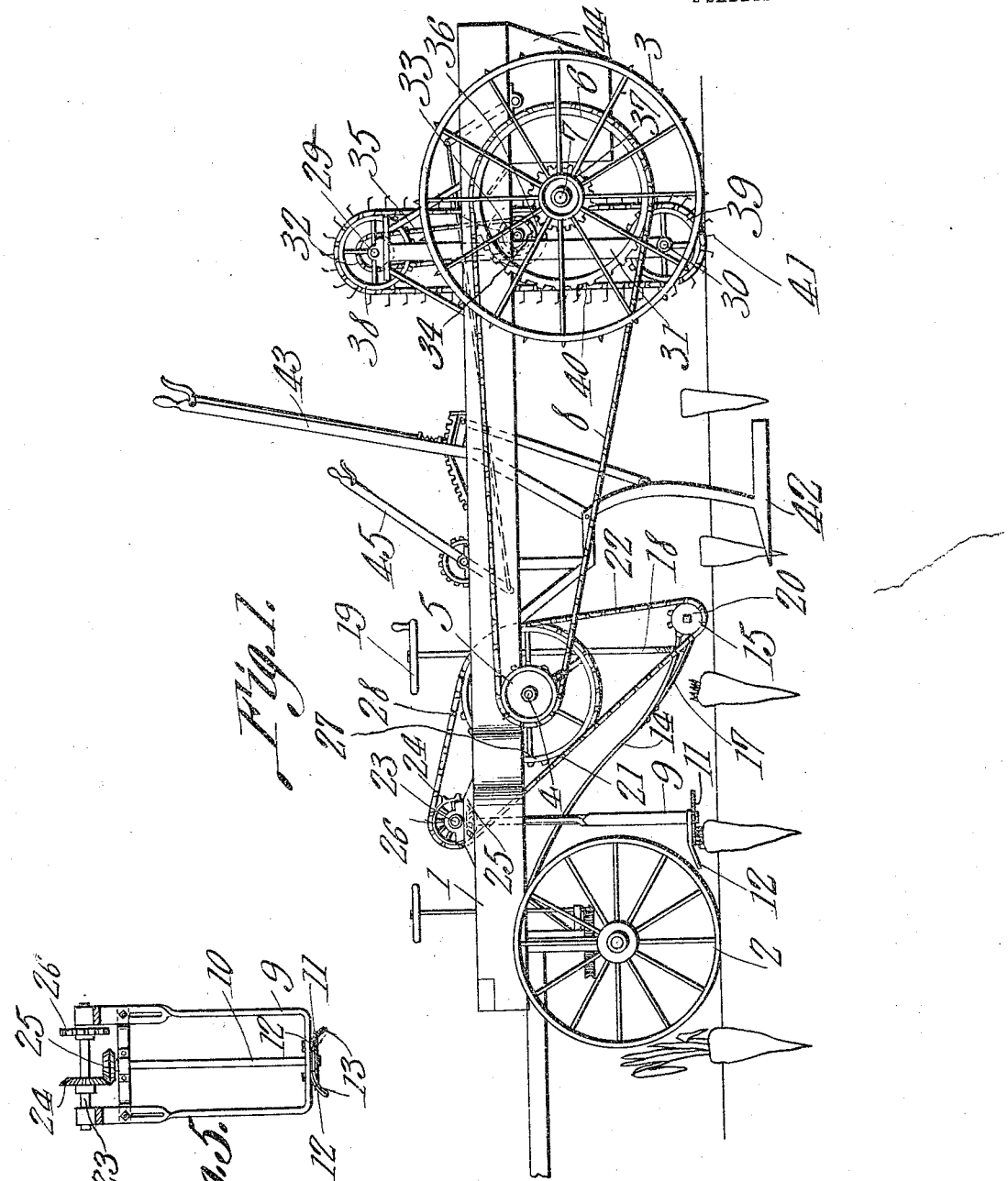

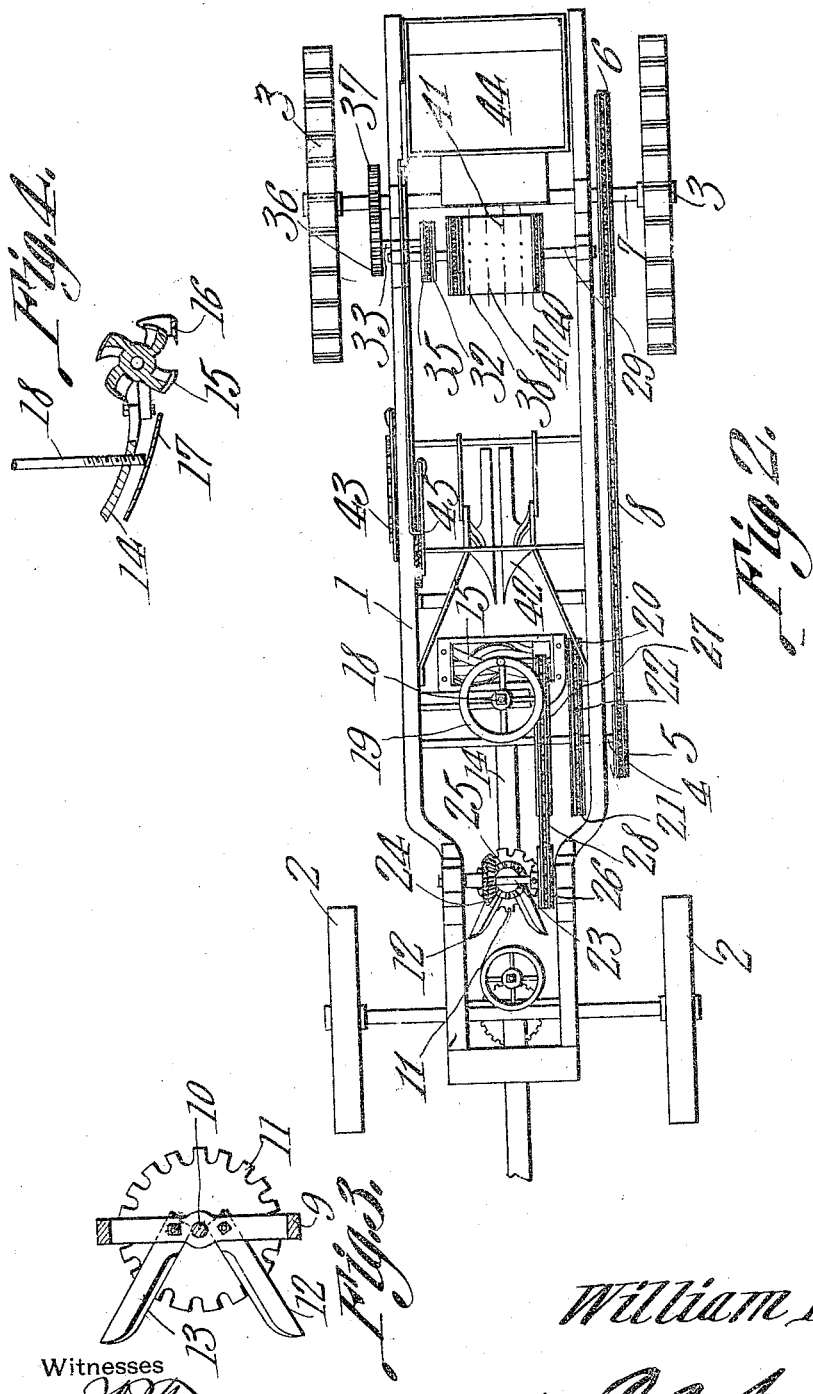

WILLIAM BATES, OF SANTA BARBARA, CALIFORNIA.

BEET-HARVESTER.

1,013,363. Specification of Letters Patent. Patented Jan. 2, 1912.

Application filed July 12, 1910. Serial No. 571,626.

*To all whom it may concern:*

Be it known that I, WILLIAM BATES, a citizen of the United States, residing at Santa Barbara, in the county of Santa Barbara and State of California, have invented a new and useful Beet-Harvester, of which the following is a specification.

This invention relates to a beet harvester and consists in the novel construction and arrangement of its parts hereinafter shown, described and claimed.

The object of the invention is to provide a machine especially adapted to harvest sugar beets and to provide means for removing the foliage and tops from the beets prior to lifting and removing the same from the ground.

With this object in view the structure includes a wheel mounted frame with means located at the forward portion thereof for removing the foliage from the beets while the beets are in the ground and means behind the said foliage removing means for cutting the tops from the beets while they are in the ground and lifters adapted to engage the beets after they have been operated upon in the manner indicated for the purpose of raising the same in the ground. Also means are provided for engaging the beets after they have been operated upon and lifted in the manner indicated whereby the beets are elevated above the surface of the ground and are deposited in a receptacle.

In the accompanying drawings,—Figure 1 is a side elevation of the beet harvester. Fig. 2 is a top plan view of the same. Fig. 3 is a plan view with parts in section of the foliage removing means. Fig. 4 is a vertical longitudinal sectional view of a portion of the beet topping devices. Fig. 5 is a front elevation of the foliage removing means.

The harvester includes a frame 1 mounted at its forward end upon dirigible wheels 2 and at its rear end upon traction wheels 3. A shaft 4 is journaled upon the frame 1 and is provided at one end with a sprocket wheel 5. A sprocket wheel 6 is mounted upon the axle which is supported upon the traction wheels 3 and a sprocket chain 8 passes around the sprocket wheels 5 and 6.

A yoke 9 is attached to the forward portion of the frame 1 and a vertically disposed shaft 10 is journaled in the said yoke. A cutting disk 11 is fixed to the lower end of the shaft 10 and gathering arms 12 are fixed to the lower portion of the yoke 9 and are located above the cutting disk 11. The gathering arms 12 are provided with chamfered edges 13 which are adapted to co-act with the cutting disk 11 for the purpose of removing the foliage from the beets in a manner hereinafter to be explained. The forward portions of the gathering arms 12 are slightly disposed in a downward direction, as indicated in Fig. 1 of the drawings.

A spring arm 14 is connected at its forward end to the forward portion of the frame 1 and a cutter 15 is journaled for rotation at the rear end of the said arm. A co-acting cutter bar 16 is located at the rear end of the arm 14 and is adapted to coöperate with the cutter 15 for the purpose of removing the tops of the beets in the manner to be explained hereinafter. A spring shoe 17 is attached to the lower rear portion of the arm 14 and a shaft 18 is screw-threaded in the lower rear portion of the said arm 14 and at its lower end bears against the upper side of the shoe 17. A hand wheel 19 is fixed to the upper end of the shaft 18 and it will be seen that by rotating the shaft 18 the said shaft will be moved longitudinally through the arm 14 and thus the shoe 17 may be forced away from the arm 14 or may be permitted to assume a position relatively near the same. Thus means are provided for causing the cutter 15 to make a deep or a shallow cut at the tops of the beets. A sprocket wheel 20 is fixed to the shaft of the cutter 15 and a sprocket wheel 21 is fixed to the shaft 4. A sprocket chain 22 passes around the wheels 20 and 21 and is adapted to transmit rotary movement from the shaft 4 to the cutter 15.

A shaft 23 is journaled for rotation upon the frame 1 at the upper end of the yoke 9 and is provided with a beveled pinion 24 which meshes with a beveled pinion 25 fixed to the upper end of the shaft 10. A sprocket wheel 26 is fixed to the shaft 23 and a sprocket wheel 27 is fixed to the shaft 4. A sprocket chain 28 passes around the sprocket wheels 26 and 27 and is adapted to transmit rotary movement from the shaft 4 to the shaft 23. Shafts 29 and 30 are journaled for rotation at the upper and lower ends respectively of arms 31 provided upon the frame 1 and a sprocket 32 is fixed to the shaft 29. A shaft 33 is journaled for rotation upon the frame 1 and is provided with a sprocket wheel 34. A sprocket chain 35 passes around the sprocket wheels 32 and 34. A gear wheel 36 is also fixed to the shaft 33 and meshes with a gear wheel 37 fixed to the axle 7. Drums 38 and 39 are carried by the shafts 29 and 30, respectively, and an endless belt 40 is arranged to move about the peripheries of the drums 38 and 39. The endless belt 40 is provided with a series of hooks or pins 41 which are adapted to engage the beets and lift the same above the surface of the soil. Digging shares 42 are connected with the frame 1 and a lever mechanism 43 is mounted upon the said frame and is operatively connected with the said digging shares and may be manipulated to raise or lower the shares with relation to the frame 1. A receptacle 44 is mounted upon the frame 1 behind the axle 7 and is adapted to receive the beets from the ends of the hooks 41 as will be explained. If desired, the receptacle 44 may be provided with a hinged side which may be operatively connected with a lever indicated at 45 in Fig. 1 of the drawings and by manipulating the lever the said hinged side may be opened at intervals whereby the contents of said receptacle may be permitted to gravitate upon the ground.

In operation as the machine is drawn along a row of beets the foliage of the plants is engaged by the gathering arms and the said foliage is directed toward the cutting disk 11 which severs the foliage from the top portions of the beets. During this cutting operation the disk 11 coöperates with the beveled edges of the gathering arm 12 to effect a shearing cut. When the shoe 17 arrives at the plant which is shorn of its top, it rides over the same and when the cutter 15 engages the top of the plant the upper portion of the root is removed together with the bottoms of the stalks or foliage. As the digging shares 42 approach the beets, the said beets are lifted slightly in the ground and are loosened sufficiently to readily permit the fingers 41 to engage the same and impale them and lift them from the ground. The beets that are carried up by the fingers 41 are carried over the shaft 29 and drum 38 and fall from the fingers 41 into the receptacle 44. After a sufficient quantity of beets has been collected in the said receptacle 44 they may be dumped upon the surface of the ground.

Having described the invention what I claim as new and desire to secure by Letters Patent is:—

1. In a beet harvester, a foliage cutter comprising a shaft mounted for rotation, a support for the shaft, a cutting disk fixed to one end of said shaft, and gathering arms secured to the supporting structure and extending along the upper surface of the disk, said arms diverging forwardly and having cutting edges coöperating with the disk, the free end portions of the arms being inclined downwardly and forwardly to points below the disk.

2. A beet harvester including a yoke, a shaft journaled therein, a cutting disk secured to the lower end of the shaft and revoluble therewith, forwardly diverging gathering arms secured to the lower end of the yoke and supported close to the upper surface of the disk, said arms having cutting edges coöperating with the disk to remove foliage from the beets, the free end portions of the arms being inclined downwardly and forwardly to points below the disk.

In testimony that I claim the foregoing as my own, I have hereto affixed my signature in the presence of two witnesses.

WILLIAM BATES.

Witnesses:
H. W. SABIN,
W. M. BATES.